April 28, 1936.    O. B. MUELLER ET AL    2,038,871
JOINT
Filed Dec. 31, 1935    3 Sheets-Sheet 3

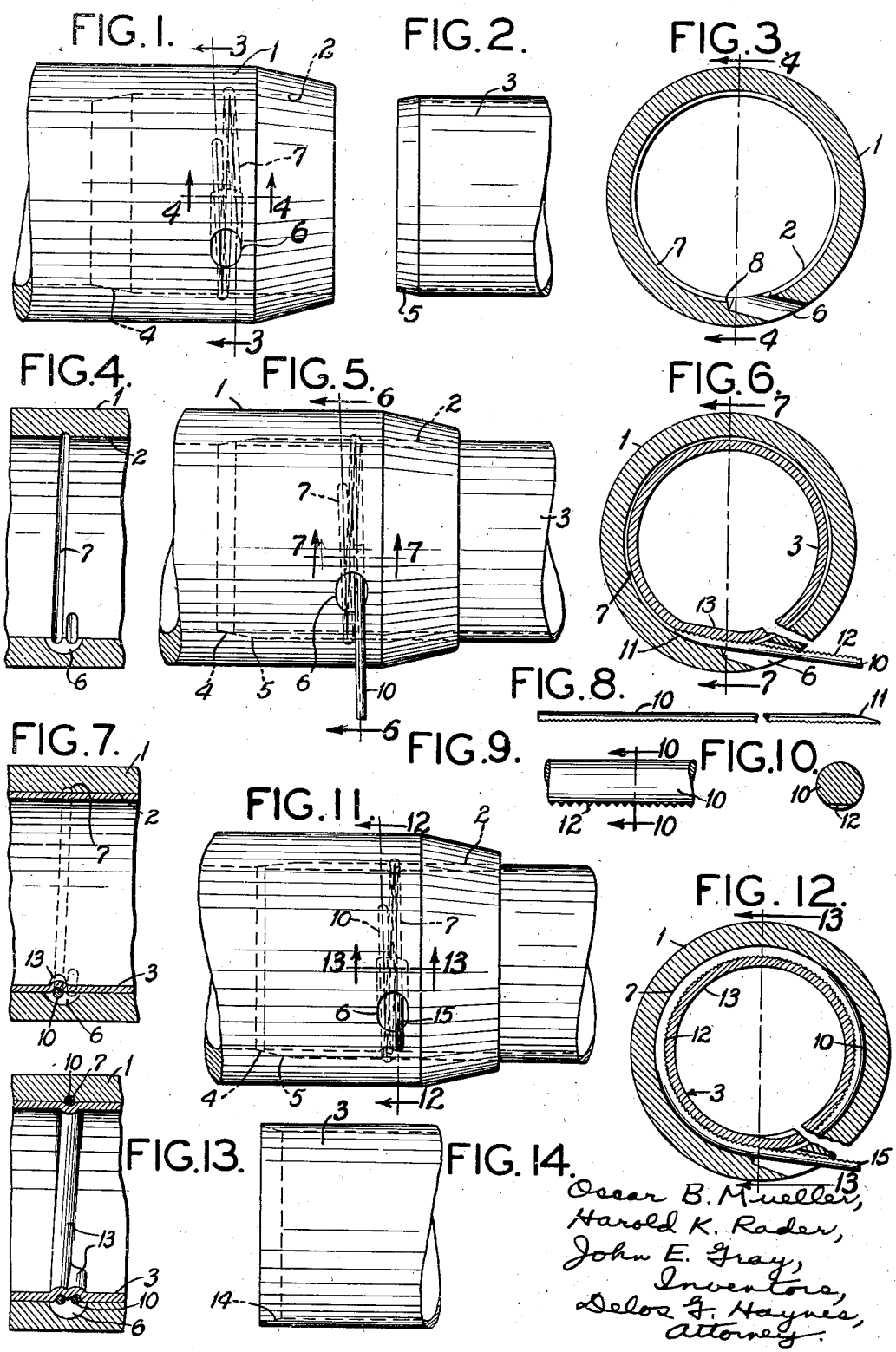

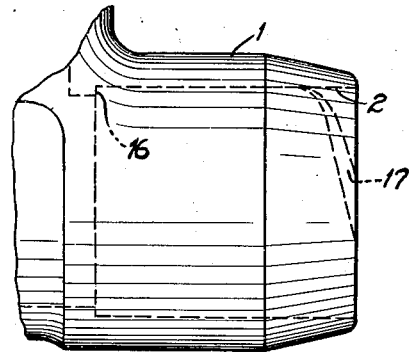
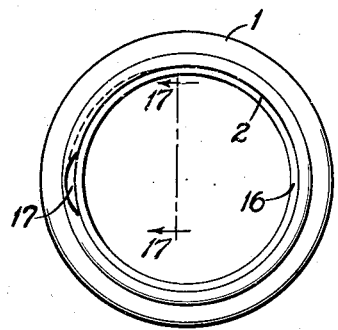
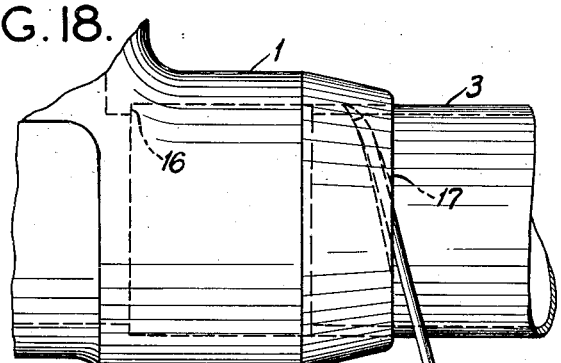
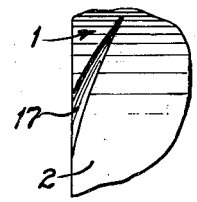
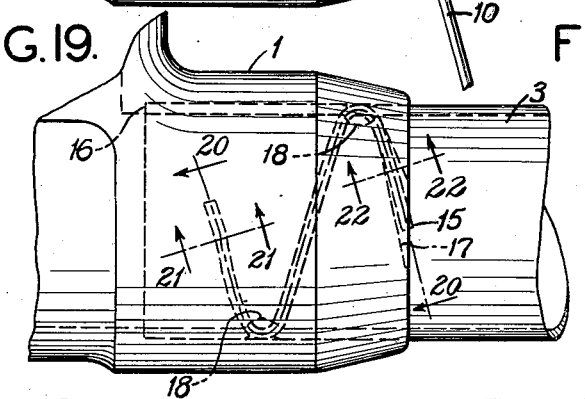
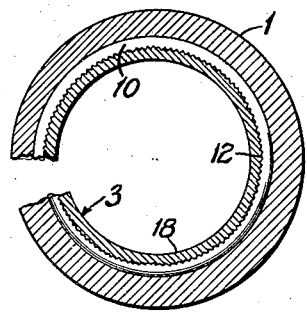
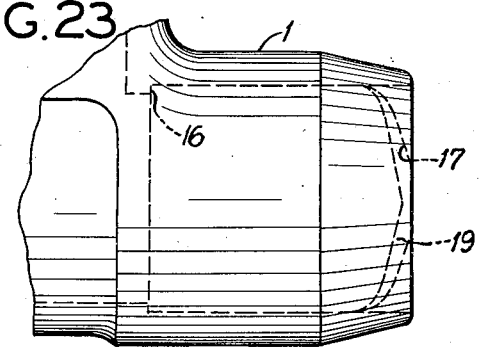
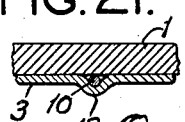

Oscar B. Mueller,
Harold K. Rader,
John E. Gray,
    Inventors,
Delos G. Haynes,
    Attorney.

Patented Apr. 28, 1936

2,038,871

UNITED STATES PATENT OFFICE 2,038,871

JOINT

Oscar B. Mueller, Harold K. Rader, and John E. Gray, Port Huron, Mich., assignors to Mueller Brass Co., Port Huron, Mich., a corporation of Michigan Application December 31, 1935, Serial No. 56,894

6 Claims. (Cl. 285—117)

This invention relates to joints and fittings, and with regard to certain more specific features, to joints and fittings for connecting together lengths of pipe and the like.

Among the several objects of the invention may be noted the provision of a pipe or like fitting which is adapted to produce an improved locked joint between the pipe and fittings; the provision of a fitting of the class described which may be assembled into a joint with minimum effort and maximum speed and facility; and the provision of a fitting of the class described which is relatively simple and economical to manufacture. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a side elevation of the end of a fitting embodying the present invention;

Fig. 2 is a side elevation of a pipe ready to telescope with the fitting of Fig. 1;

Fig. 3 is a cross section taken substantially along line 3—3 of Fig. 1;

Fig. 4 is a longitudinal section taken substantially along line 4—4 of Figs. 1 and 3;

Fig. 5 is a view similar to Fig. 1, illustrating an initial step in making a joint;

Fig. 6 is a cross section taken substantially along line 6—6 of Fig. 5;

Fig. 7 is a longitudinal section taken substantially along line 7—7 of Figs. 5 and 6;

Fig. 8 is a side elevation of a locking member;

Fig. 9 is an enlarged fragmentary elevation of the locking member of Fig. 8;

Fig. 10 is a cross section taken substantially along line 10—10 of Fig. 9;

Fig. 11 is a side elevation similar to Fig. 5 illustrating a completed joint;

Fig. 12 is a cross section taken substantially along line 12—12 of Fig. 11;

Fig. 13 is a longitudinal section taken substantially along line 13—13 of Figs. 11 and 12;

Fig. 14 is a side elevation of a pipe, and represents an alternative embodiment to the embodiment shown in Fig. 2;

Fig. 15 is a side elevation of a fragment of a fitting embodying an alternative form of the invention;

Fig. 16 is an end elevation of the fitting of Fig. 15;

Fig. 17 is a fragmentary elevation taken substantially at the position indicated by line 17—17 on Fig. 16;

Fig. 18 is a view similar to Fig. 15, illustrating an initial step in making a joint;

Fig. 19 is a view similar to Figs. 15 and 18, illustrating a completed joint;

Fig. 20 is a cross section taken substantially along line 20—20 of Fig. 19;

Fig. 21 is an enlarged cross section taken substantially along line 21—21 of Fig. 19;

Fig. 22 is an enlarged cross section taken substantially along line 22—22 of Fig. 19;

Fig. 23 is a side elevation of an embodiment of the invention alternative to the embodiment of Fig. 15;

Similar reference characters indicate corresponding parts throughout the several views of the drawings.

Figure 24:
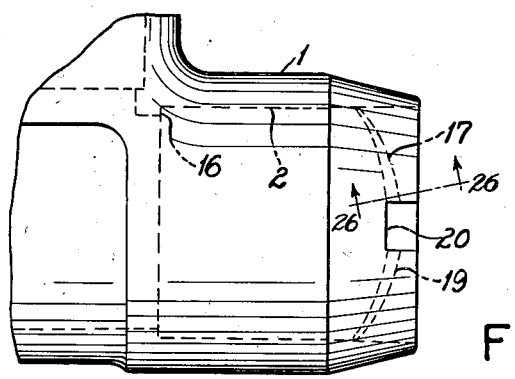
Fig. 24 is a side elevation of the end of a fragment of a fitting embodying still a further form of the invention.
Figure 25:
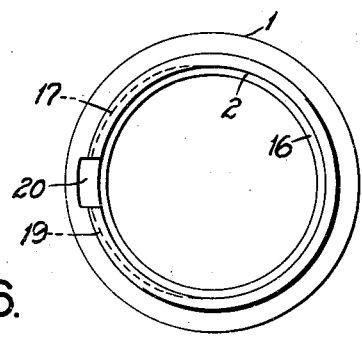
Fig. 25 is an end elevation of the fitting shown in Fig. 24.
Figure 26:
Fig. 26 is a section taken substantially along line 26—26 of Fig. 24.

Referring now more particularly to Fig. 1, numeral 1 indicates a receiving end of a pipe fitting, which may, for purpose of illustration, be considered as one branch of a T. The T has been chosen for exemplary purposes only, and it is to be understood that the invention applies with equal facility to all classes of pipe fittings, as L's, couplings, crosses, nipples, adapters, caps, valve ends, and the like, the sole criterion being that the fitting must have a socket portion 2 which is adapted to telescopingly receive the length of pipe or the like which it is desired to connect thereto.

Basically, the fitting 1 is of the general type shown in Gresley et al. Patent No. 1,776,502, and Lindquist Patent No. 1,890,998. That is, it is a fitting designed particularly for use with unthreaded, relatively thin-walled pipe, which is usually made of copper. Such a pipe, for example, is indicated at numeral 3 in Fig. 2. In accordance with the teaching of said Lindquist Patent No. 1,890,998, the socket portion 2 is bottomed by a gradual inwardly tapered region 4. It is desirable that the pipe 3 be provided with a chamfer, of a taper adapted to fit against the taper 4, as indicated by numeral 5 in Fig. 3. The purpose of the taper 4 and chamfer 5 will be more apparent hereinafter.

In accordance with the teaching of the said Gresley and Lindquist patents, one method of effecting a joint with this fitting is carried through by telescoping the pipe 3 in the socket 2, and thereafter introducing liquid solder or like sealing material into the interfacial region between the pipe and fitting, whence it spreads by capillary attraction until said interfacial region is entirely filled. It will be understood that the receiving portion of the socket 2 and the pipe 3 are so dimensioned that the clearance therebetween is of suitable size to induce said capillary flow of the liquid solder.

The present invention provides new means supplementing the solder film described, whereby the pipe here used is securely locked into the fitting 1.

The smooth inner wall of the socket 2 is, as has been intimated, of true cylindrical shape. Into the side wall of the fitting 1 in the region of the socket 2, there is bored a hole indicated by numeral 6. By reference to Fig. 3, it will be seen that the axis of the hole 6 is at an angle to the radius of the cylindrical shape of the fitting. In other words, the hole 6 is in a tangential, or skew position. On the inner face of the socket 2, in position to communicate with the hole 6, there is provided a groove 7, which is helical in character. The groove 7 is arranged to make slightly more than one complete turn around the inner face 2 of the fitting. In other words, the ends of said groove 7 overlap each other, to a limited extent, as indicated in Fig. 1. Where they overlap each other, it is advantageous that the ends of the groove 7 be spaced apart between $\frac{1}{32}$ and $\frac{3}{32}$ of an inch; in other words, the lead of the helix is from $\frac{1}{32}$ to $\frac{3}{32}$ of of an inch. This dimension is not arbitrary, and may be varied at will to suit different sizes of pipes and fittings and the like. The hole 6 is of sufficient width to cover the entire region of overlap of the groove 7, as indicated in Fig. 1. It will be appreciated that one end of the groove 7 commences, as indicated at numeral 8 in Fig. 3, at the hole 6, while the other end of the groove 7 terminates beyond the hole 6 in the wall of the fitting.

Referring now to Fig. 8, numeral 10 indicates a length of wire which is usually of circular cross section. The circular cross section is not essential to the present invention, but it has been found to operate advantageously with the substantially semi-circular cross section of the groove 7 indicated in Fig. 4. The length of the wire 10 is preferably slightly over the circumferential length of the groove 7, for purposes which will be made apparent hereinafter.

The wire 10 is described in detail and claimed in the copending application of Francis Jordan Wilson, Serial No. 69,891, filed March 20, 1936.

At one end of the wire 10 there is provided a tapered portion 11. Along the entire length of the wire 10, on the side thereof opposite the tapered portion 11, there are provided corrugations or serrations 12. The serrations 12 are desirably sufficiently sharp so that they are able to bite into the metal of the pipe 3, as will be pointed out hereinafter. The shape of the serrations 12 is indicated in Fig. 10, which is an enlarged cross-sectional view of the wire 10.

It is preferable, both from the standpoint of ease of manufacture, and from the standpoint of more readily securing a good joint, that the serrations 12 extend the entire length of the wire 10. However, under certain circumstances, this is not altogether necessary, and a short region of corrugations or serrations need only be provided near the tapered end 11.

The wire 10 constitutes the locking member of the present invention. Its application is indicated in Figs. 5 and 11. Referring to Fig. 5, it will be seen that the pipe 3 is now shown as inserted into socket 2 of the fitting 1, until the chamfered end 5 abuts the tapered portion 4. The tapered end 11 of the wire 10 is now inserted through the hole 6 in such manner that it is tangential to the pipe 3, and engages said pipe 3 under the groove 7 at the point said groove 7 commences. The serrations 12 engage the side of the pipe 3. The skew position of the hole 6 permits such a tangential insertion of the wire 10. The wire 10, it will be understood, is of greater diameter than the space provided for it by the groove 7.

If the pipe 3 is now manually grasped, exteriorly of the fitting, and turned in a clockwise manner, it will be seen that the serrations 12 bite into the walls of said pipe, thereby dragging or pulling along the wire 10. The wire 10 is desirably made of a harder material than the pipe 3. For example, if the pipe 3 is copper, the wire 10 may be brass, steel, iron or the like. Because of this relative difference in hardness, and because the diameter of the wire 10 is greater than the region provided for it by the depth of the groove 7, a groove 13 (see also Figs. 7 and 13) is forced into the pipe 3 as it is turned. Because of the thin walls of the pipe 3, the groove 13 is accompanied by a corresponding bead on the interior surface of the pipe 3. The pipe 3 is thus turned until the leading end 11 of the locking wire 10 moves along the entire length of the groove 7, and abuts the end thereof. Thus, slightly over a complete turn of the pipe 3 is needed.

Because of the slight lead of the helical groove 7, this turning or twisting of the pipe 3 in engagement with the wire 7 means that it will be axially advanced into the fitting, with considerable force behind it, one lead-space for each complete turn of the pipe. This axial advancement of the pipe 3 into the fitting as the wire 10 is drawn into locking position means that the chamfered end 5 will abut the tapered end 4 of the socket 2 with greater and greater force, thus providing a jam fit between the pipe 3 and the fitting 1 which is, of itself, substantially sealed and leak-proof. The advance of the pipe 3 into the fitting 1 is indicated by the difference in position of the pipe 3 in Fig. 5 and in Fig. 11, which shows a substantially completed joint.

Fig. 14 shows a pipe 3 in which the end is internally chamfered, as indicated at numeral 14, in place of the external chamfer 5 of Fig. 2. When a pipe of this sort is used, the ends thereof are weakened by the internal chamfer 14, and the jam fit incident to the locking operation deforms the weakened end of the pipe, against the taper 4, thus providing an even more securely sealed joint.

As heretofore intimated, the length of the wire 10 is desirably somewhat greater than the length of the groove 7. This means that when the position of Fig. 11 has been achieved, a short length of the wire 10, indicated by numeral 15, is left extending through the hole 6. This end 15 visible from the exterior of the fitting, forms a signal or sign that the completed joint is a locked one. If no such signal is desired, the length of the wire 10 may be made such that it is entirely drawn in the fitting in the course of rotating the pipe, thus leaving no end 15 exposed.

The joint shown in Fig. 11 is a securely locked, substantially sealed joint without further manipulation. The jam fit at the end of the pipe 3 against the taper 4 provides a substantial seal, while the wire 10, in position between the helical grooves 7 and 13 in the fitting and pipe, respectively, locks the pipe 3 in the fitting 1 against unintended withdrawal thereof. However, in order completely to seal the joint, liquid solder or similar sealing material may be fed in through the hole 6. The wire 10, in forming the groove 13, provides a slight peripheral space on each side of itself; hence, the liquid solder which is introduced at the opening 6 travels around the fitting through the groove 13 to spread by capillary attraction into the interfacial region in the same manner as set forth in the said Gresley patent. By the addition of said sealing material, the joint is made additionally tight.

A combination locked and sealed joint, such as that just described, is particularly useful, for example, in a fire sprinkler installation where it is essential that the installation remain in position even though the temperature become sufficiently high to melt the solder. With a joint as thus described, even if the solder or sealing material melts and is forced out the joint by the pressure in the line, a locked joint which is relatively tightly sealed is still maintained, and the pipe does not come out of the fitting. Even when the molten solder is blown from the joint, it will be appreciated that surface tension still holds films of solder against the pipe, the walls of the fitting and the locking wire, and these films so nearly completely fill the available face that leakage is reduced to a minimum, if there is any present at all.

The form of locking wire indicated in Figs. 8, 9 and 10 is not essential to the present invention. It is merely necessary that some form of locking wire be provided that can be secured to the pipe. Another embodiment of the invention, in this respect, would comprise a smooth-surfaced wire with its end turned over to form a short hook, which hook is inserted in a hole drilled in the pipe 3 for that purpose.

From the foregoing, it will be seen that one of the broad, principal features of the present invention is that the locking member is drawn into position between the pipe and fitting by rotating the pipe relative to the fitting, and that at the same time that said locking member is drawn in, by the particular conformation of the elements provided, the pipe 3 is advanced axially in the fitting 1, securing a jam fit therebetween.

Figures 15 through 22 indicate another embodiment of the invention conforming to this general principle. Referring to Fig. 15, the customary fitting 1 is shown, together with the smooth cylindrical socket 2. However, in place of the tapered portion 4 bottoming the socket 2, a right-angle flange 16 is provided for limiting the insertion of the pipe 3. It is to be understood however, that the tapered bottom portion 4 may be provided if desired.

The fitting of this embodiment has no hole 6, nor any internal groove 7 as in the prior embodiment. In place thereof, there is provided a groove 17 which curves helically inwardly from the end face of the fitting (see Fig. 16). The groove 17 commences, at the end face of the fitting 1, with a depth substantially equal to the diameter of the locking wire 10, which is also used in this embodiment. It proceeds helically into the socket 2, but ordinarily does not go much over a quarter of a turn. As it advances into the fitting, it becomes shallower and shallower, until it finally disappears. The remainder of the socket 2 comprises a plain unbroken cylindrical surface. Fig. 17 indicates the shape and characteristics of the groove 17 described.

Fig. 18 shows the initial step in using the present form of the invention. The pipe 3 is shown as cut off square at its end, and without either the external chamfer 5 of the Fig. 2 pipe or the internal chamfer 14 of the Fig. 14 pipe. However, the pipe 3, for this embodiment, may be chamfered either exteriorly or interiorly if desired. In making the joint, the pipe is first inserted but a short distance into the socket 2. This is indicated in Fig. 18. The locking wire 10 is then inserted into the groove 17, with the serrations 12 engaging the pipe 3. The wire 10 is inserted by hand as far as it may be pushed. Thereafter, the pipe 3 is grasped and turned in a clockwise manner. This draws the locking wire 10 into the fitting in an advancing screw, or helix fashion. As it advances in the groove 17, the decreasing depth of said groove forces the wire 10 to impress an oppositely facing helical groove 18 (see Figs. 19, 20, 21 and 22) into the pipe 3. Finally, at the point that the groove 17 ends, the entire wire 10 is being forced into the groove 18, which is now forced to be deep enough to accommodate the entire wire. These conditions are indicated in Fig. 21.

The initial helical guide provided by the groove 17 compels the locking wire 10 to assume a helical conformation even after it has proceeded beyond the end of the groove 17. Thus, when the position of Fig. 19 has been achieved, the wire 10 lies almost entirely within the fitting (an end 15, however, preferably projecting for the usual signal purpose). The end of the pipe 3 is securely abutted, by this time, against the shoulder 16 of the fitting, thus providing a jam fit as in the prior embodiment of the invention.

It will be seen that the number of turns necessary to bring the end of the pipe 3 against the shoulder 16 is determined by the pitch of the groove 17. In the embodiment shown in the drawings, the pitch is such that one complete turn substantially serves to bring the pipe 3 into the desired jammed position within the fitting.

After the position of Fig. 19 has been achieved, molten solder may be poured into the mouth of the groove 17, at the end of the fitting, to flow therefrom throughout the joint and seal it in the manner heretofore indicated.

The wire 10 in this embodiment securely locks the joint because of its tight fit between the groove 13 formed in the pipe by the wire and the walls of the fitting, and also because, at the mouth of the fitting, the wire 10 lies partly in a groove 13 in the pipe, and partly in the groove 17 in the fitting.

Fig. 23 shows an embodiment of the invention similar in many respects to the Fig. 15 embodiment. In this figure, instead of single groove 17, there is provided an additional groove 19, which leads in the opposite direction from the same opening at the end of the fitting. This groove 19 may be used when it is desired to advance the pipe by twisting it in a counterclockwise direction. The fitting of Fig. 23 is adaptable to more circumstances, for this reason, than the fitting of Fig. 15, although it will be understood that the grooves 17 and 19 are never both used at the same time.

Figures 24 through 29 indicate another embodiment of the invention partaking, in some respects, of the same general ideas as are present in the embodiment of Fig. 23. However, in this embodiment, the groove 17 and 19, instead of commencing directly from the outer face of the fitting, commence from the opposite sides of a notch 20, of rectangular shape, which is cut or formed into the end face of the fitting. The grooves 17 and 19, as in the prior embodiment, extend but a short way around the fitting, and become constantly shallower as they progress. They are of helical shape, as in the prior embodiment.

Figure 27:
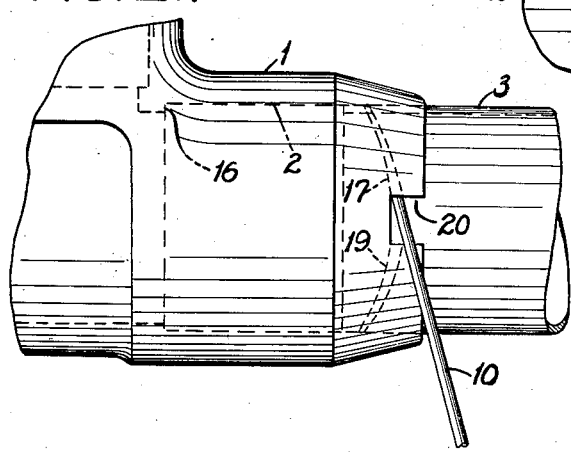
Fig. 27 is a view similar to Fig. 24, illustrating an initial step of making a joint.

With this embodiment of the invention, as indicated in Fig. 27, the locking wire 10 is initially positioned by inserting it through the notch 20, tangentially to the pipe 3, in either the groove 17 or the groove 19, depending upon the direction of rotation of the pipe 3. As in the Fig. 15 embodiment, the pipe 3 is initially pushed into the fitting only a relatively short distance, and is finally brought into completely telescoping position only by twisting and thus drawing in the locking wire 10.

The notch 20 may be used for the introduction of sealing material, such as solder, to complete the joint.

It will be understood that the embodiment of Fig. 24 may be made with but one groove 17, in distinction to the two grooves 17 and 19, and thus be similar to the embodiment of Fig. 15 in this respect.

Figure 28:
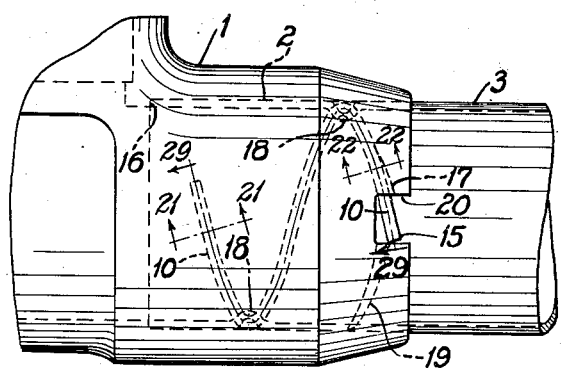
Fig. 28 is a side elevation similar to Fig. 27, illustrating a completed joint.

The finished joint, with this embodiment of the invention, is substantially as shown in Fig. 28. It is so similar to the finished joint of the prior embodiment, that no detailed explanation is believed to be needed.

Figure 30:
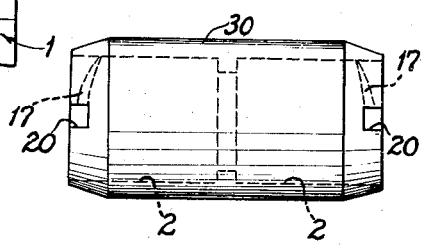
Fig. 30 is a side elevation of a still further embodiment of the invention.
Figure 29:
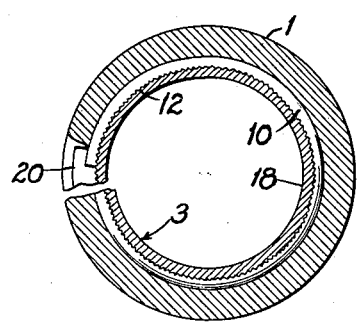
Fig. 29 is a cross section taken substantially along line 29—29 of Fig. 28.

Fig. 30 illustrates a coupling fitting 30 wherein the grooves 17 and notches 20 of the Fig. 24 embodiment are provided. In the case of a coupling (or of a T or of other fitting) having two coaxial sockets 2, it is desirable that the grooves 17 be in reverse directions at the oppositely facing sockets. For example, in Fig. 30 the groove 17 of the right-hand socket is a clockwise groove, while the groove of the left-hand socket is counter-clockwise, both considered as when facing the respective ends. With these provisions, pipes may be inserted in each socket, and wires in each notch, and the fitting turned in one direction, whereupon both wires will be drawn in and both joints locked at the same time. The embodiments of the other figures of the drawings may likewise be used in constructing such a coupling, or similar fitting.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

We claim:

1. A joint comprising a fitting having a socket, a thin-walled metallic entering member telescopingly received in said socket, said socket having a preformed interior helical groove, a locking member in said groove and engaging the entering member in such manner as to form an oppositely faced helical groove therein, with a helical bead on the interior of the entering member, and a film of solidified sealing material occupying the interfacial region between said socket and said entering member.

2. A joint comprising a fitting having a socket, a thin-walled metallic entering member having a tapered end telescopingly received in said socket, said socket being bottomed by an inwardly tapered portion and having a preformed interior helical groove, a locking member in said groove and engaging the entering member in such manner as to form an oppositely faced helical groove therein, with a helical bead on the interior of the entering member, the tapered end of the entering member being jammed against the tapered portion of the socket, and a film of solidified sealing material occupying the interfacial region between said socket and said entering member.

3. A joint comprising a fitting having a socket, a thin-walled metallic entering member telescopingly received in said socket, said socket having a preformed interior helical groove intermediate its ends, an opening communicating with said groove, a locking member introduced through said opening and positioned in said groove and engaging the entering member in such manner as to form an oppositely faced helical groove therein, with a helical bead on the interior of the entering member, and a film of solidified sealing material occupying the interfacial region between said socket and said entering member.

4. A joint comprising a fitting having a socket, a thin-walled metallic entering member telescopingly received in said socket, said socket having a preformed interior helical groove advancing from the end of the socket, a locking member in said groove and engaging the entering member in such manner as to form an oppositely faced helical groove therein, with a helical bead on the interior of the entering member, and a film of solidified sealing material occupying the interfacial region between said socket and said entering member.

5. A joint comprising a fitting having a socket, a thin-walled metallic entering member telescopingly received in said socket, said socket having a notch at its end, and a preformed interior helical groove advancing from the notch into the socket, a locking member in said groove and engaging the entering member in such manner as to form an oppositely faced helical groove therein, with a helical bead on the interior of the entering member, and a film of solidified sealing material occupying the interfacial region between said socket and said entering member.

6. A joint comprising a fitting having a socket, a thin-walled metallic entering member telescopingly received in said socket, said socket having a preformed interior groove proceeding helically for a distance short of complete encircling of the socket, a wire locking member in said groove and extending beyond said groove substantially completely to encircle said entering member, said locking member engaging the entering member in such manner as to form an oppositely faced substantially completely encircling groove therein, with a substantially completely encircling bead on the interior of the entering member, and a film of solidified sealing material occupying the interfacial region between said socket and said entering member.

OSCAR B. MUELLER.
HAROLD K. RADER.
JOHN E. GRAY.